United States Patent
Barrenscheen

(10) Patent No.: US 8,195,857 B2
(45) Date of Patent: Jun. 5, 2012

(54) COUPLING DEVICES, SYSTEM COMPRISING A COUPLING DEVICE AND METHOD FOR USE IN A SYSTEM COMPRISING A COUPLING DEVICE

(75) Inventor: Jens Barrenscheen, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 12/642,419

(22) Filed: Dec. 18, 2009

(65) Prior Publication Data

US 2011/0153889 A1    Jun. 23, 2011

(51) Int. Cl.
*G06F 13/00*    (2006.01)
*G06F 13/14*    (2006.01)
*G06F 7/38*    (2006.01)
*H01L 25/00*    (2006.01)

(52) U.S. Cl. ............. 710/110; 710/305; 326/37; 326/41
(58) Field of Classification Search ............... 710/110, 710/305; 326/37, 41
See application file for complete search history.

(56) References Cited

U.S. PATENT DOCUMENTS

| | | | | |
|---|---|---|---|---|
| 5,928,345 | A * | 7/1999 | Tetzlaff et al. | 710/107 |
| 6,268,745 | B1 * | 7/2001 | Stringham | 326/82 |
| 6,680,904 | B1 * | 1/2004 | Kaplan et al. | 370/217 |
| 6,928,501 | B2 * | 8/2005 | Andreas et al. | 710/110 |
| 6,993,616 | B2 * | 1/2006 | McLachlan | 710/305 |
| 7,032,202 | B2 * | 4/2006 | Guettaf et al. | 716/113 |
| 7,265,578 | B1 * | 9/2007 | Tang et al. | 326/40 |
| 7,460,482 | B2 * | 12/2008 | Pike | 370/241 |
| 7,523,239 | B2 * | 4/2009 | Shimizu | 710/110 |
| 7,538,577 | B2 * | 5/2009 | Bollinger | 326/41 |
| 7,554,357 | B2 * | 6/2009 | Chen et al. | 326/39 |
| 7,622,948 | B1 * | 11/2009 | Wennekamp | 326/38 |
| 7,765,269 | B2 * | 7/2010 | Kanekawa et al. | 709/208 |
| 7,779,323 | B2 * | 8/2010 | Wang et al. | 714/731 |
| 2002/0019898 | A1 * | 2/2002 | Hayashi et al. | 710/110 |
| 2003/0039243 | A1 * | 2/2003 | Parker | 370/362 |
| 2003/0052710 | A1 * | 3/2003 | Lasselet Goldfinch | 326/37 |
| 2004/0064608 | A1 * | 4/2004 | McLachlan | 710/62 |
| 2008/0052417 | A1 * | 2/2008 | Aoyama et al. | 710/1 |
| 2008/0273475 | A1 * | 11/2008 | Priyantha et al. | 370/257 |
| 2009/0230870 | A1 * | 9/2009 | Quazi | 315/85 |

OTHER PUBLICATIONS

ARM, Application Note 132, Connecting Multiple JTAG Devices, Jun. 1, 2008.*

* cited by examiner

*Primary Examiner* — Paul R Myers
*Assistant Examiner* — Christopher A Daley
(74) *Attorney, Agent, or Firm* — Dickstein Shapiro LLP

(57) ABSTRACT

The invention relates to coupling devices, a system comprising a coupling device and a method for use in a system comprising a coupling device.
In accordance with an aspect of the invention, there is provided a coupling device for serial communication comprising a first slave having daisy chain capability and being configured to be coupled to and communicate with a first master, a second slave configured to be coupled to and communicate with a second master, and at least one buffer enabling data exchange between the first slave and the second slave, even if the first slave and the second slave are driven by different clocks.

25 Claims, 6 Drawing Sheets

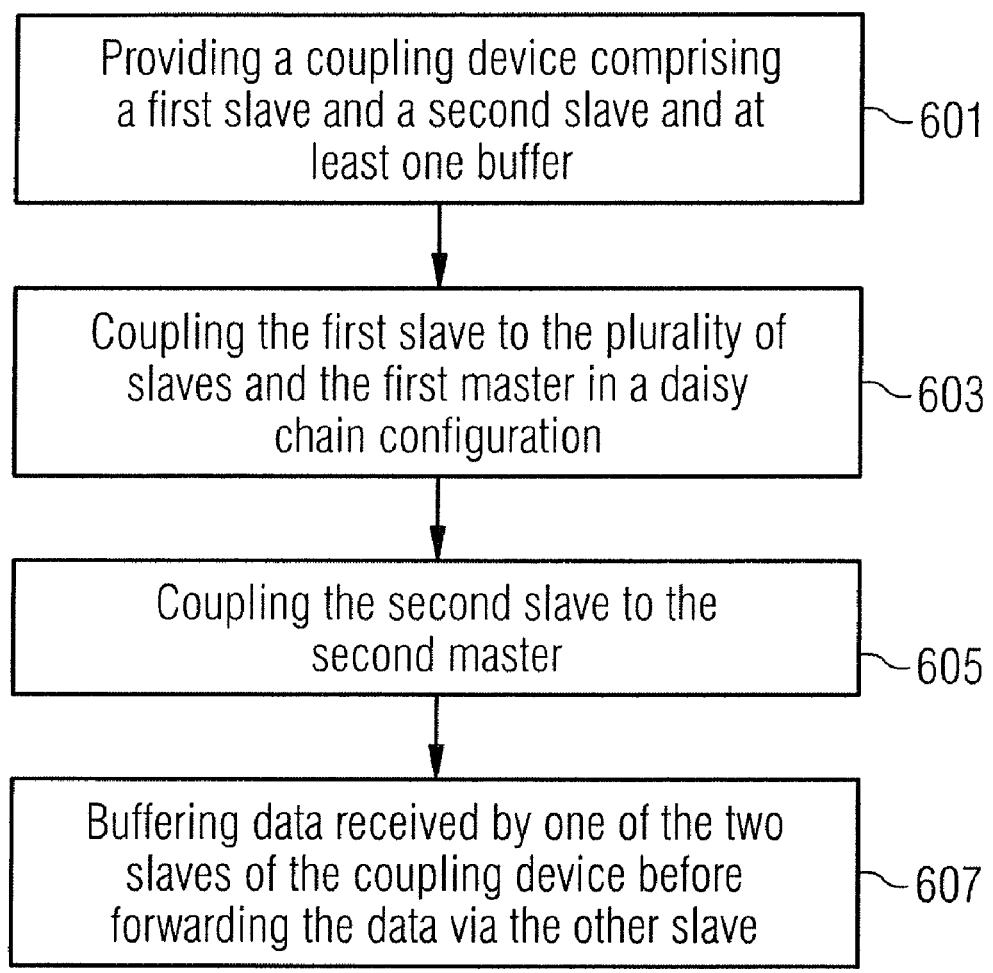

COUPLING DEVICES, SYSTEM COMPRISING A COUPLING DEVICE AND METHOD FOR USE IN A SYSTEM COMPRISING A COUPLING DEVICE

The application relates to coupling devices, a system comprising a coupling device and a method for use in a system comprising a coupling device.

BACKGROUND

In the, by now, common Programmable Logic Controllers (PLC), but also in many other applications, data links for communicating between separate devices are often implemented as data busses having a daisy chain configuration. A daisy chained bus is formed by linking a transmit output of a device to a receive output of a following device. The resulting chain is controlled by a master which generates control signals for shifting the data and the timing thereof The daisy chain structure is particularly suited for data exchange via a Serial Peripheral Interface (SPI) bus which is a synchronous serial data link standard. Devices communicate in master/slave mode wherein the master initiates the data frames. Herein, a data frame is a series of data packets, wherein the beginning of a frame is indicated by enabling a slave select signal and the end of the frame is indicated by disabling the slave select signal. In an independent slave SPI configuration, multiple slave devices are allowed with individual slave select lines for each slave.

In contrast to the independent slave SPI configuration, the daisy chain configuration provides only a single slave select line for all slaves. Herein, data may be sent during a first group of clock pulses and, during a second group of clock pulses, the received data may be forwarded to the next member of the daisy chain. Accordingly, the SPI port of each slave is designed to send out, during the second group of clock pulses, an exact copy of what it received during the first group of clock pulses. Therefore, the whole chain may be considered as an SPI communication shift register.

FIG. 1 shows an example for a typical daisy chain structure based on SPI. This structure is solely exemplary, in particular, the connection structure and the number of slaves are arbitrary. Different connection structures and other numbers of slaves are also possible.

SPI master 110 comprises a transmit buffer 110a having a data output (DO), a receive buffer 110b having a data input (DI), and a baud rate generator 110c for generating a slave select signal (SLS) and a shift clock signal (SCLK). A first SPI slave 121 comprises a transmit buffer 121a having a data output (DO), a receive buffer 121b having a data input (DI), and a so called slave function block 121c which indicates the actual function of the first slave 121. A second SPI slave 122 comprises a transmit buffer 122a having a data output (DO), a receive buffer 122b having a data input (DI), and a so called slave function block 122c which indicates the actual function of the second slave 122. A third SPI slave 123 comprises a transmit buffer 123a having a data output (DO), a receive buffer 123b having a data input (DI), and a so called slave function block 123c which indicates the actual function of the first slave 123.

The data output of the master 110 is connected to the data input of the first slave 121 via connection 101; the data output of the first slave 121 is connected to the data input of the second slave via connection 102; the data output of the second slave is connected to the data input of the third slave 123 via connection 103; and the data output of the third slave 123 is connected to the data input of the master via connection 104.

The first (121), second (122) and third (123) slave are connected to the baud rate generator 110c of the master 110 via connection 105 for receiving a slave select signal (SLS) and also via connection 106 for receiving a shift clock signal (SCLK).

FIG. 2 shows an example typical for a data exchange between members of a daisy chain such as shown in FIG. 1. In a daisy chain configuration, each member transmits its own transmit date to its data output at the beginning of a frame and then forwards data already received by then. Thus, a complete frame comprises a series of data of the individual members wherein the data is transmitted consecutively. Each member has its own word which is transmitted. As an example, "DS01" indicates the word of the first slave 121, etc. Only the master sends an amount of data which equals the added word length of all slaves. In FIG. 2, the target data of the master for the first slave 121 is indicated as "DM01", etc.

The order of data within a frame, as exemplarily depicted in FIG. 2, is determined by the arrangement of the slaves in the daisy chain, in the example shown in FIG. 2, the exemplary daisy chain structure of FIG. 1. It is noted that the term "frame" as used herein indicates the time period in which the slave select signal is active and data is transmitted to all members once.

The master first receives a word from the slave which is adjacent to the receiver of the master in the chain, which, in this example, is the third slave 123, and then the word from the slave which is the next one in the chain (when starting from the receiver of the master), which, in this example, is the second slave 122, etc.

The order of data sent from the master to the slaves is determined by the arrangement of the slaves in the chain in a similar way: The data for the slave being most remote from the transmitter of the master in the chain (here: the third slave) is sent first, then the data for the previous one in the chain (here: the second slave) and the data for the slave which is adjacent to the transmitter of the master in the chain (here: the first slave) is sent last.

The frame is initiated by the master activating the slave select signal and, by deactivating the slave select signal, the master indicates to all members of the chain (i.e. slaves) that the frame is completed and the data received last (i.e. content of the respective receive buffer) is the target data for the respective member and can be taken into account by the slave function.

Each slave includes a receive buffer having the same size (i.e. word size=number of bits) as its own data in the transmit buffer. The bit width may differ depending on the function of the respective member. When the content of its transmit buffer has completely been sent after the beginning of the frame, the data received in the meantime are forwarded. Not until the end of the frame, the data in the receive buffer are considered valid. Until then, the data in the receive buffer are simply shifted, i.e. forwarded.

The actual functions of the slaves 121, 122 and 123 which are represented by the function blocks 121c, 122c and 123c, respectively, receive the data sent by the master (MS01, MS02, MS03) when the frame is completed and can provide read data (DS01, DS02, DS03).

In particular, but not solely, in the case of PLC applications, many present or also future slave devices also require, in addition to the actual input/output function (as already described with reference to FIGS. 1 and 2), also control and diagnostic functions or capabilities. These functions run in parallel to normal operation of the master-slave arrangement or include power saving capabilities.

In order to obtain meaningful diagnostics of the function in- and outputs, a relatively large amount of data has to be analyzed at certain points (e.g. determining edge steepness when switching). Depending on the application, the kind of diagnostics may also vary.

It is advantageous to provide local diagnostics capabilities in or near the slave to be monitored in order to avoid interfering with or delaying data communication in the master-slave arrangement. Accordingly, a diagnostics unit operated in parallel to the slave may be provided, which monitors inputs and outputs of the slave according to application requirements and transmits status information to the master.

FIG. 3 shows an exemplary implementation of a diagnostics unit operated in parallel to a slave in a master-slave arrangement similar to the one shown in FIG. 1. Only the second slave 222 has been modified in that its function block 222c comprises a diagnostic function and a connection 207 between the diagnostic function block 222c of the second slave 222 and the function block 223c of the third slave 223 has been added in FIG. 3. Thus, the diagnostic device for the third slave 223 is implemented as a slave device arranged within the daisy chain and connected to the slave to be monitored.

As the requirements for such diagnostic devices differ widely, development of specific devices proves difficult, however. Instead, provision of appropriate programmable devices, such as microcontrollers, may be more practical. In this case, however, another problem arises: Though most (low cost) microprocessors comprise an SPI interface, their interfaces are usually not adapted for daisy chain configurations or a high internal clock rate is required to operate the interface.

Therefore, there e.g. exists a need for a low cost coupling device which is adapted to be implemented in daisy chain configurations ("daisy chain capability") and enables coupling via a standard interface of the microprocessor.

BRIEF SUMMARY

In accordance with an aspect of the application, there is provided a coupling device for serial communication comprising a first slave having daisy chain capability and being configured to be coupled to and communicate with a first master, a second slave configured to be coupled to and communicate with a second master, and at least one buffer enabling data exchange between the first slave and the second slave, even if the first slave and the second slave are driven by different clocks.

In accordance with a further aspect of the application, there is provided a method for use in a system comprising a first master, a second master, and a plurality of slaves coupled to the first master in a daisy chain configuration, wherein the method comprises: providing a coupling device comprising a first slave, a second slave, and at least one buffer; coupling the first slave to the plurality of slaves and the first master in the daisy chain configuration; coupling the second slave to the second master; and buffering data received by one of the two slaves of the coupling device before forwarding the data via the other slave.

Further features, aspects and advantages of the present application will become apparent from the following detailed description made with reference to the accompanying drawings.

BRIEF DESCRIPTION OF THE SEVERAL VIEWS OF THE DRAWING(S)

The accompanying drawings are included to provide a further understanding of the present application and are incorporated in and constitute a part of this specification. The drawings illustrate embodiments of the present application and together with the description serve to explain the principles of the application. Other embodiments of the present application and many of the intended advantages of the present application will be readily appreciated as they become better understood by reference to the following detailed description.

FIG. 6 shows a schematic simplified flowchart illustrating a method in accordance with an embodiment.

DETAILED DESCRIPTION

In the following detailed description, reference is made to the accompanying drawings, which form a part hereof, and in which is shown by way of illustration specific embodiments. It is to be understood that other embodiments may be utilized and structural or other changes may be made without departing from the scope of the present application. The following detailed description, therefore, is not to be taken in a limiting sense, and the scope of the present application is defined by the appended claims.

The arrangement will become more complex if the slaves are energized with a supply voltage different from the supply voltage of the master and/or the slaves also among each other are provided with different supply voltages. In this case, the respective members of the chain have to be galvanically isolated (or at least electrically isolated). As there are a plurality of isolating means well-known in the art, such as optoelectronic, capacitive or inductive couplers, or simple level shifters, these means will not be further described herein.

For this and other reasons, the present application provides a coupling device acting as link between the, e.g. daisy chained, master slave arrangement and an additional master, e.g. microprocessor, or a further master-slave arrangement.

Figure 1:
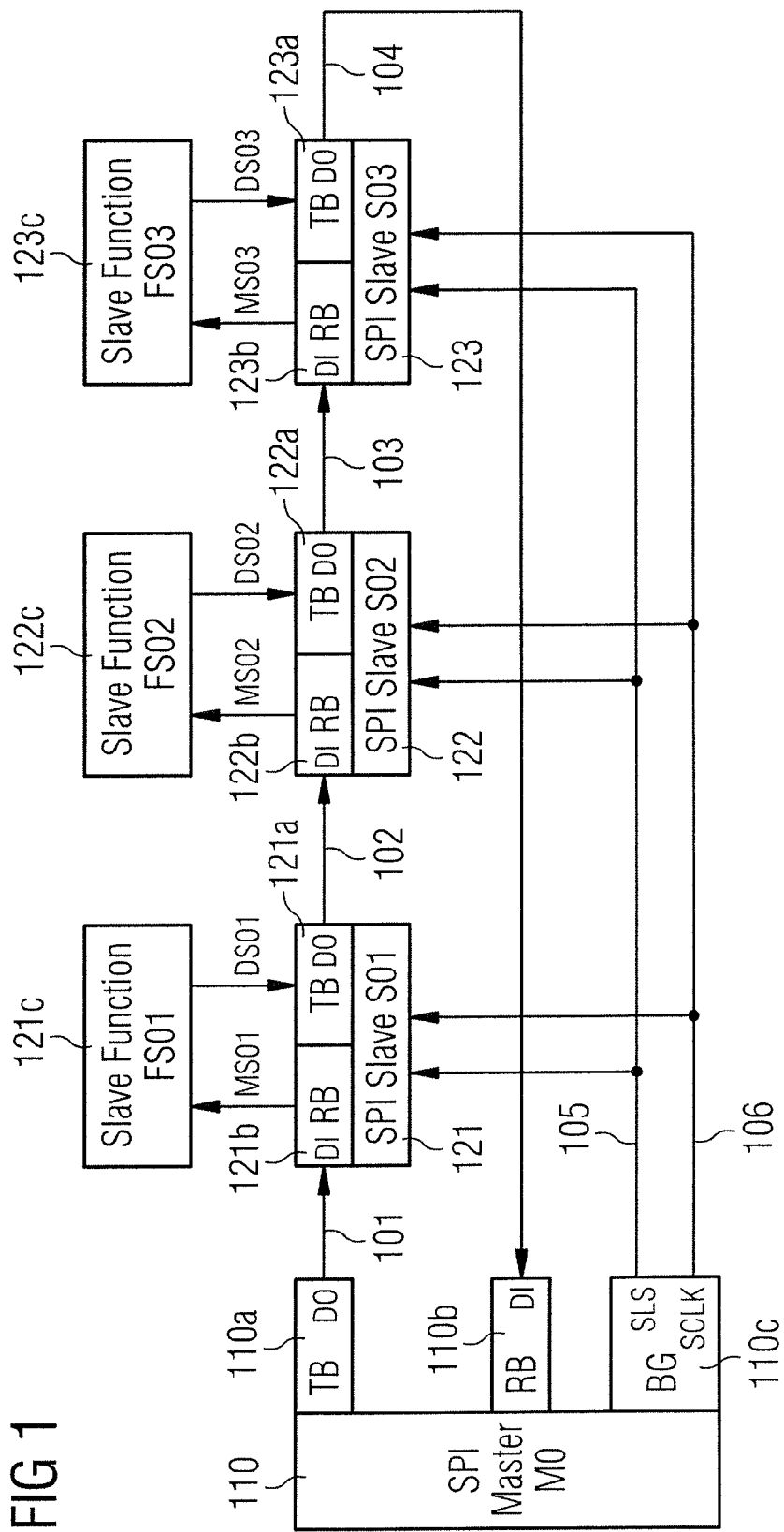
FIG. 1 shows an example for a typical daisy chain structure based on SPI.
Figure 2:
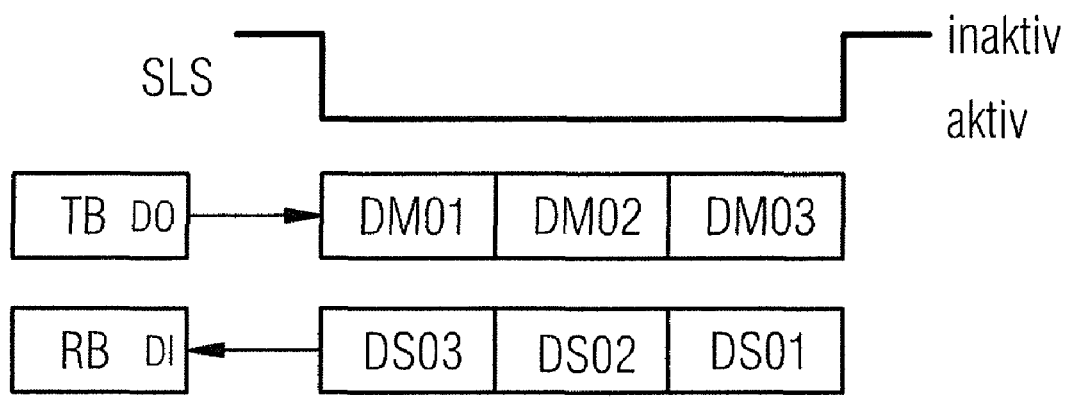
FIG. 2 shows an example for a typical data exchange between members of a daisy chain.
Figure 3:
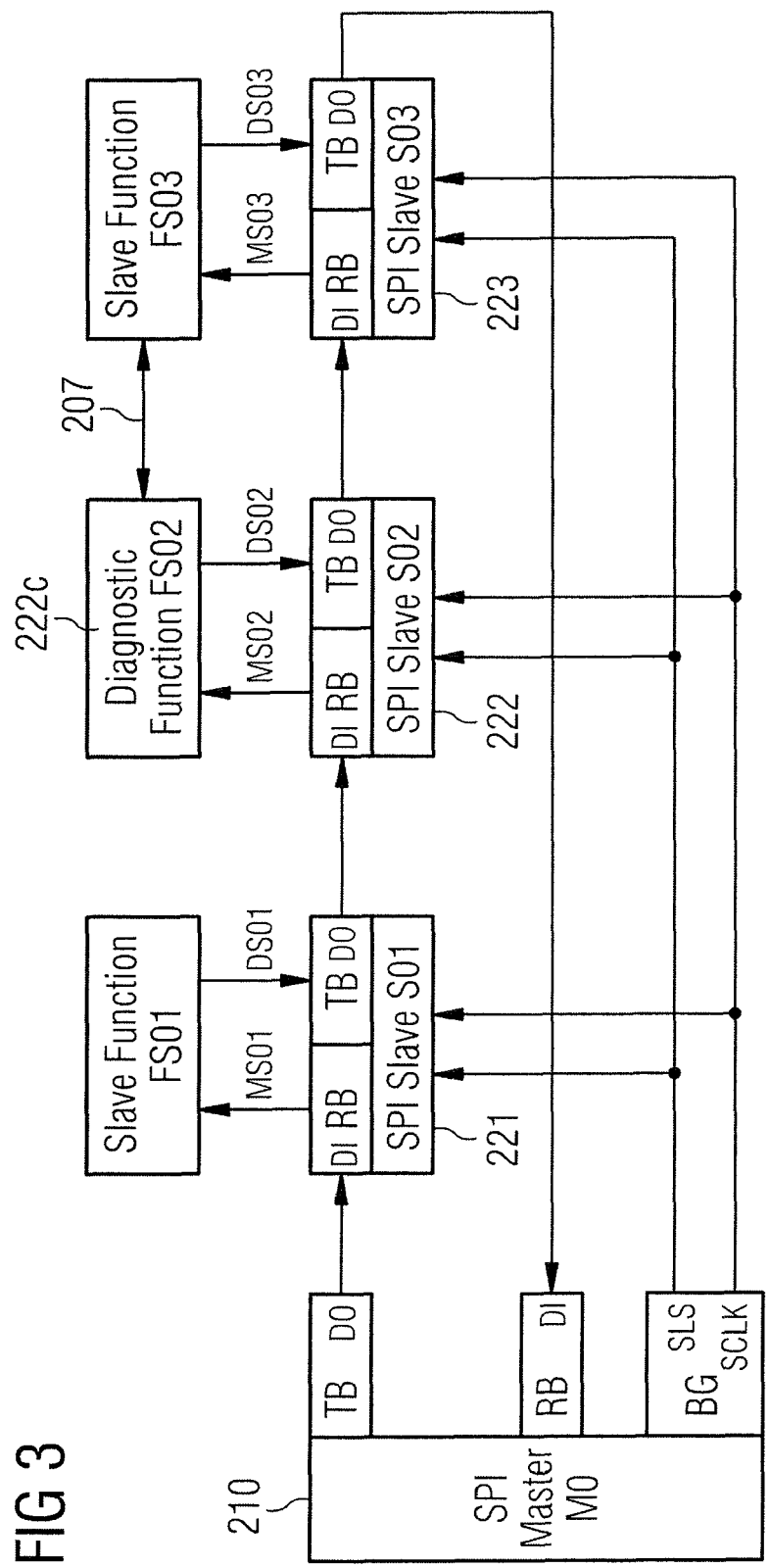
FIG. 3 shows an exemplary implementation of a diagnostics unit operated in parallel to a slave in a master-slave arrangement similar to the one shown in FIG. 1.
Figure 4:
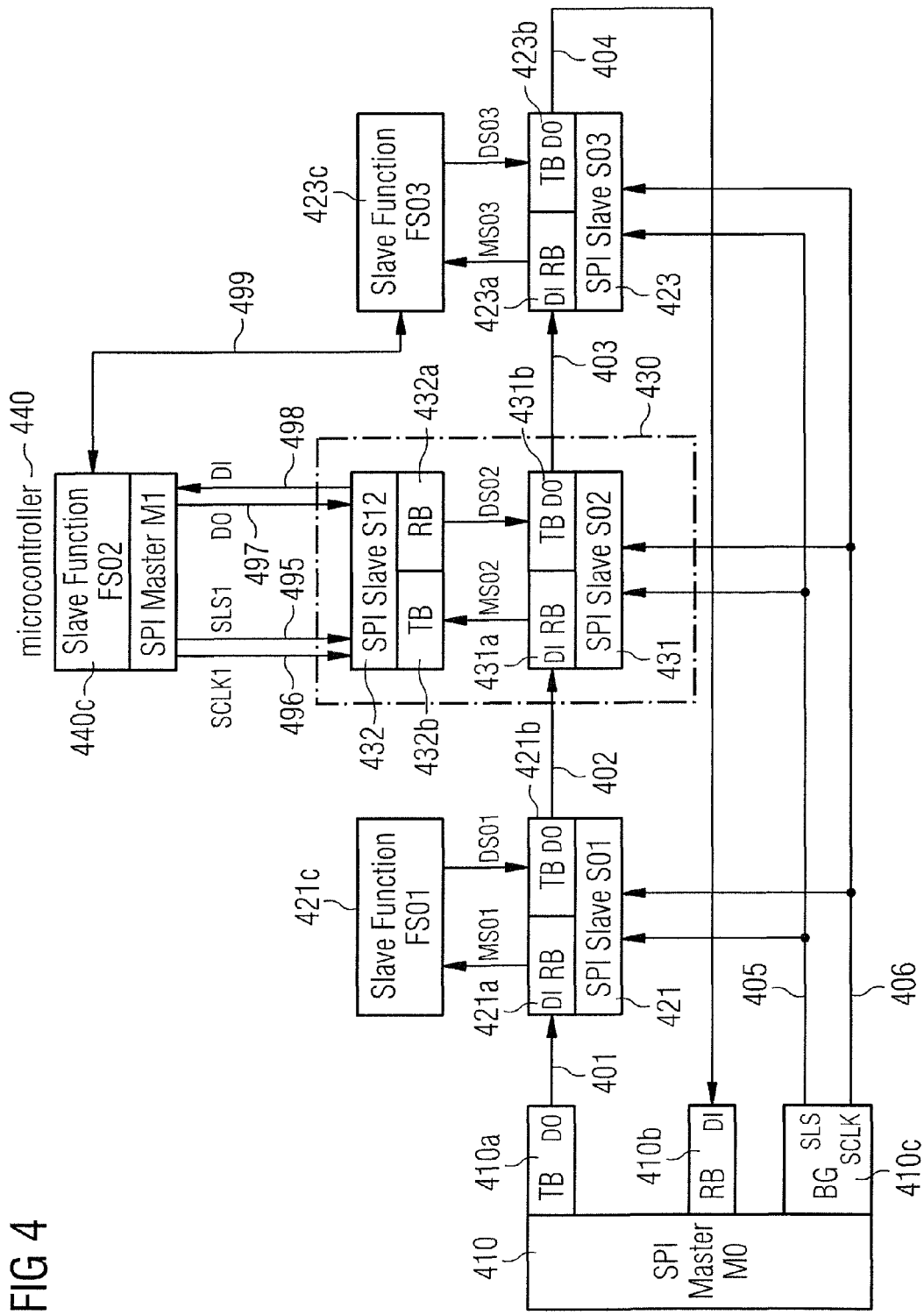
FIG. 4 shows a coupling device according to an embodiment which is implemented in an exemplary master slave arrangement having daisy-chain configuration.

FIG. 4 shows a coupling device according to an embodiment which is implemented in an exemplary master slave arrangement having a daisy-chain configuration. The illustrated arrangement comprises a first master 410, a second master such as e.g. microcontroller 440, a first slave 421, a second slave 423, and a coupling device 430, wherein the first master 410, the first 421 and second 423 slave and the coupling device form a daisy chain.

The first master 410 comprises a transmit buffer 410a having a data output (DO), a receive buffer 410b having a data input (DI) and a baud generator 410c. The first and second slave 421 and 423, respectively, comprise receive buffers 421a and 423a, respectively, with dedicated data inputs, transmit buffers 421b and 423b, respectively, with dedicated data outputs, and function blocks 421c and 423c, respectively. The coupling device comprises a third slave 431 having a receive buffer 431a and a transmit buffer 431b and a fourth slave 432 having a receive buffer 432a and a transmit buffer 432b. The microcontroller 440 comprises a diagnostic function block 440c.

The data output of the first master 410 is connected to the data input of the first slave 421 via connection 401; the data output of the first slave 421 is connected to the data input of the third slave 431 via connection 402; the data output of the third slave 431 is connected to the data input of the second slave 423 via connection 403; and the data output of the second slave 423 is connected to the data input of the first master via connection 404. The first 421, second 423 and third 431 slave are connected to the baud rate generator 410c of the first master 410 via connection 405 for receiving a slave select signal (SLS) and also via connection 406 for receiving a shift clock signal (SCLK). Within the coupling device 430, the receive buffer and transmit buffer, respectively, of the third slave 431 are connected to the transmit buffer and the receive buffer, respectively, of the fourth slave via connections 491 and 492, respectively. The fourth slave is further connected to the microcontroller via connections 495 and 496 for receiving a further slave select signal (SLS1) and a further shift clock signal (SCLK1) and also via connections 497 and 498 for communicating data. Further, diagnostic function block 440c of the microcontroller 440 is connected to the function block 423c of the second slave 423 for monitoring the second slave 423.

In this embodiment, the coupling device 430 is addressed from both sides and respectively acts as slave. On one side, the third slave 431 is addressed and controlled by the first master 410, and on the other side, the fourth slave 432 is addressed and controlled by the second master which is, in this embodiment, the microcontroller 440. As the data exchange between both sides within the coupling device is effected on the basis of words, the actual serial interfaces are decoupled with regard to the respective clocks: The (daisy) chain comprising the first, second and third slave 421, 423, and 431 is operated and clocked with the SCLK and SLS of the first master 410 and the fourth slave is operated and clocked with the SCLK1 and SLS1 of the second master, the microcontroller 440.

Thus, a standard microcontroller with master functionality can be employed as diagnostics device using the coupling device according to the above embodiment. Advantageously, the microcontroller may perform a data reduction to reduce the required bandwidth for transmission via the bus, for example, only the result of the diagnosis may be transmitted over the bus. Thus, provided that a fixed bandwidth is given, a better diagnosis may be achieved.

Further, a standard microcontroller with master functionality may also be employed to achieve a higher level of safety using the coupling device according to the above embodiment. In this case, the microcontroller acts as second independent entity providing functional redundancy by generating and transferring respective data in an alternative way. Thus, a certain error will generate a different error pattern that can easily be detected. It is noted that this application offers both local and temporal independency.

In a preferred embodiment, the coupling device further comprises isolating means for galvanically isolating the first slave from the second slave. The isolating means enable the first and second slave to be provided with different supply voltages: If the microcontroller 440 and the first master 410 have different supply voltages, also the first and second slave of the coupling device are operated with different supply voltages unless there is an isolating means coupled between the respective slave and master. Accordingly, the first and second slave of the coupling device may not only be operated asynchronously, but also may be on different potentials.

As there are a plurality of isolating means well-known in the art, such as optoelectronic, capacitive or inductive couplers, or simple level shifters, these means will not be further described herein.

A further embodiment may advantageously be used for safety applications. Also in the case of safety applications, diagnostic data has to be captured in order to detect errors at an early stage. One feasible error control method is to enable an external master to read a word from a chain (e.g. master-slave arrangement) to be monitored. Further, it may be advantageous to mirror certain words to a second chain to obtain information about the functionality of the first chain. Furthermore, such a coupling may be provided to enable data exchange between two control units or masters each operating a dedicated chain of slaves.

Figure 5:
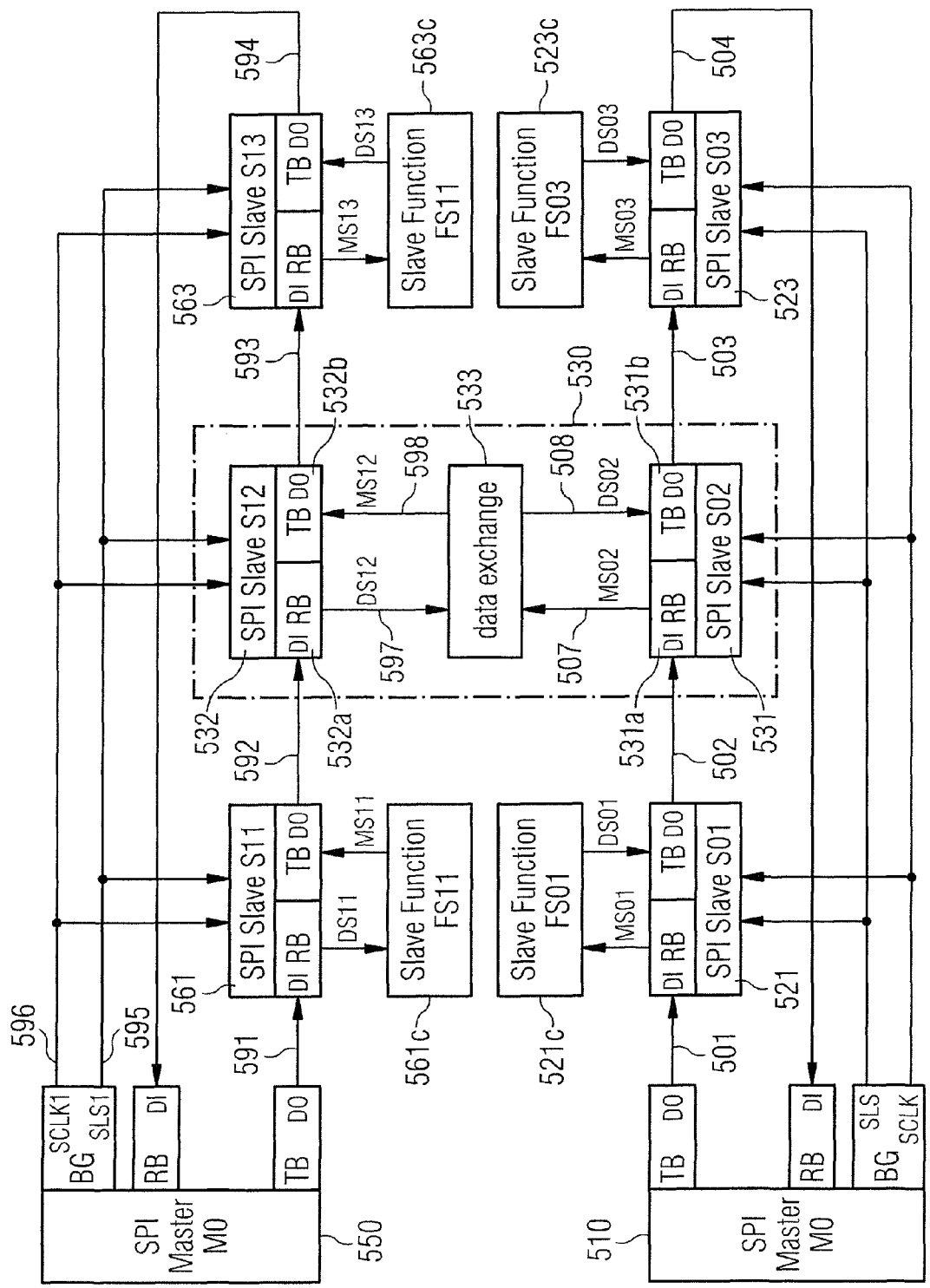
FIG. 5 shows a coupling device according to a further embodiment implemented in a system of two l.arate master-slave arrangements with a daisy chain configuration.

FIG. 5 shows a coupling device 530 according to a further embodiment implemented in a system of two separate master-slave arrangements with a daisy chain configuration for enabling data exchange between the two chains.

A first chain is formed by a first master 510, a first slave 521, a second slave 523, and a third slave 531 and a second chain is formed by a second master 550, a fifth slave 561, a sixth slave 563, and a fourth slave 532. The third 531 and fourth slave 532 are comprised in the coupling device 530 which couples the first chain to the second chain to enable a data exchange between the two chains. Each slave comprises a receive buffer and a transmit buffer and the first, second, fifth and sixth slave 521, 523, 561 and 563 additionally comprise a function block 521c, 523c, 561c and 563c, respectively. The coupling device 530 comprises the third and fourth slave 531, 532 and a data exchange block 533, wherein the third and fourth slave are connected via the data exchange block 533.

A data output of the first master 510 is connected to a data input of the first slave 521 via connection 501; a data output of the first slave 521 is connected to a data input of the third slave 531 via connection 502; a data output of the third slave 531 is connected to a data input of the second slave 523 via connection 503; and a data output of the second slave 523 is connected to a data input of the first master 510 via connection 504. The first 521, second 523 and third 531 slave are connected to the baud rate generator (BG) of the first master 510 via connection 505 for receiving a slave select signal (SLS) and also via connection 506 for receiving a shift clock signal (SCLK).

The data output of the second master 550 is connected to a data input of the fifth slave 561 via connection 591; a data output of the fifth slave 561 is connected to a data input of the fourth slave 532 via connection 592; a data output of the fourth slave 532 is connected to a data input of the sixth slave 563 via connection 593; and a data output of the sixth slave 563 is connected to a data input of the second master 550 via connection 594. The fifth 561, sixth 563 and fourth 532 slave are connected to the baud rate generator (BG) of the second master 550 via connection 595 for receiving a further slave select signal (SLS1) and also via connection 596 for receiving a further shift clock signal (SCLK1).

Within the coupling device 530, the receive buffer 531a and transmit buffer 531b of the third slave 531 are connected to the data exchange block 533 via connections 507 and 508, respectively, and the receive buffer 532a and transmit buffer 532b of the fourth slave 532 are connected to the data exchange block 533 via connections 597 and 598, respectively.

In this embodiment, the coupling device 530 is addressed from both sides and respectively acts as slave. On one side, the third slave 531 is addressed and controlled by the first master 510, and on the other side, the fourth slave 532 is addressed and controlled by the second master 550.

In a preferred embodiment, the data exchange block 533 is configured to transfer data between the third and fourth slave only as complete words. For this reason the data exchange block 533 comprises an appropriate buffer configuration: A receive buffer of at least one interface of the coupling device comprises an intermediate buffer which is dimensioned for words. The content of the receive buffer changes incessantly. As soon as a word is taken as valid (either due to deactivation of the SLS or after a predetermined number of received bits), the content of the receive buffer is transferred to the intermediate buffer. The content of the intermediate buffer is available and may be used for other tasks even if data traffic over the interface continues. In other words, the intermediate buffer contains a "snapshot" of the receive buffer at a certain time. The content of the intermediate buffer may serve as source for the transmit buffer of the other interface of the coupling device. To enable bidirectional data communication via the coupling device, at least two intermediate buffers are required (one for each receiving interface).

The data exchange block 533 may further comprise isolating means such as optoelectronic, capacitive or inductive couplers, or simple level shifters for galvanically isolating one chain from the other.

Hence, both chains can be operated completely independently and asynchronously: The (daisy) chain comprising the first, second and third slave 521, 523, and 531 is operated and clocked with the SCLK and SLS of the first master 510 and the (daisy) chain comprising the fifth, sixth and fourth slave 561, 563, and 532 is operated and clocked with the SCLK1 and SLS1 of the second master 550.

In a preferred embodiment, the data exchange block 533 may be configured to indicate or request new data in respective chains:

Identifying a new word for transfer (not each frame mandatorily provides a new word or transfer is affected only, when there is a change in the data), e.g. to simplify handling of semaphores between the chains.

Masking of words or indication of a predetermined data content by sending an interrupt to a designated master: For example, a chain may be in a power saving mode and transfer of a certain data content causes a wake-up sequence.

In a particularly preferred embodiment, the data exchange block is configured to identify a word after an arbitrary number of data bits. In other words, the time for determination of a word to be transferred is not limited to a point at the end of a frame, but the determination may be performed after a selectable number of data bits within a frame.

Thus, for example, the second master 550 is enabled to selectively read certain words in the chain operated by the first master 510 and, therefore, to monitor specific functions. By selecting several points within the frame, the second master 550 may "scan" the slaves located between the data output of the first master 510 and the couple device 530. If the slaves of the whole chain are to be monitored, the coupling device is to be located at the end of the chain, i.e. most remote from the data output of the first master 510 or next to the data input of the first master 510, respectively.

The coupling device just described may be utilized very favorably, when implemented in a chain comprising a sensor which supplies data required by both the first and second master 510, 550. The capability of defining the point, when received data are considered valid, opens a variety of applications, as it provides a fast and efficient communication path between the two master devices 510 and 550, similar to a data mirror which mirrors data captured by the sensor located in one chain to the other chain. Thus, additional fast communication paths between the two master devices 510 and 550 may not be required.

FIG. 6 shows a schematic simplified flowchart illustrating a method in accordance with an embodiment.

In step 601, a coupling device comprising a first slave, a second slave and at least one buffer is provided.

Then, in step 603, the first slave is coupled to the plurality of slaves and the first master in a daisy chain configuration and the second slave is coupled to the second master in step 605.

Finally, data received by one of the two slaves of the coupling device is buffered before forwarding the data via the other slave.

Although specific embodiments have been illustrated and described herein, it will be appreciated by those of ordinary skill in the art that a variety of alternate and/or equivalent implementations may be substituted for the specific embodiments shown and described without departing from the scope of the present application. This application is intended to cover any adaptations or variations of the specific embodiments discussed herein. Therefore, it is intended that this application be limited only by the claims and the equivalents thereof.

What is claimed is:

1. A coupling device for serial communication comprising:
a first slave having daisy chain capability and being configured to be coupled to and communicate with a first master;
a second slave configured to be coupled to and communicate with a second master; and
at least one buffer enabling data exchange between the first slave and the second slave, even if the first slave and the second slave are driven by different clocks,
wherein the coupling device acts as a link between the second master and the coupling of the first slave and the first master.

2. The coupling device of claim 1, wherein the second slave has daisy chain capability.

3. The coupling device of claim 1, wherein the first master is coupled to a plurality of slaves forming a daisy chain and the first slave of the coupling device is configured to be coupled to the first master as one of the plurality of slaves in the daisy chain.

4. The coupling device of claim 1, wherein data exchange between the first slave and the second slave is carried out by an exchange of complete words, wherein data is buffered in the at least one buffer until a word is completed.

5. The coupling device of claim 1, wherein the first slave and the second slave of the coupling device comprise SPI interfaces.

6. The coupling device of claim 1, further comprising isolating means for galvanically isolating the first slave from the second slave.

7. The coupling device of claim 6, wherein the isolating means are one of the following:
optoelectronic coupler;
capacitive coupler; or
inductive coupler.

8. The coupling device of claim 1, further comprising a level shift function without galvanic isolation.

9. The coupling device of claim 1, wherein the second slave is configured to be coupled to and communicate with a microcontroller.

10. The coupling device of claim 1, wherein the at least one buffer comprises a receive buffer, an intermediate buffer, and a transmit buffer.

11. The coupling device of claim 10, wherein the coupling device is further configured to transfer data between the first and second slave as complete words.

12. The coupling device of claim 1, wherein the coupling device is further configured to identify a word to be exchanged between the first and second slave after receiving a predetermined number of data bits.

13. The coupling device of claim 12, wherein the coupling device is further configured to check a data content of the word and determine, based on the result of the check, whether the word will be exchanged between the first and second slave.

14. The coupling device of claim 12, wherein the predetermined number of data bits is specified by the second slave device.

15. The coupling device of claim 1, wherein the second master is coupled to a second plurality of slaves forming a second daisy chain and the second slave of the coupling device is configured to be coupled to the second master as one of the second plurality of slaves in the second daisy chain.

16. A system comprising:
a first master;
a second master;
a plurality of slaves coupled to the first master in a daisy chain configuration; and
a coupling device comprising:
a first slave coupled to the plurality of slaves and the first master within the daisy chain configuration;
a second slave coupled to the second master; and
at least one buffer enabling data exchange between the first slave and the second slave, even if the first slave and the second slave are driven by different clocks,
wherein the coupling device acts as a link between the second master and the coupling of the first slave and the first master.

17. The system of claim 16, wherein the first master, the second master, each slave of the plurality of slaves, and the coupling device comprise SPI interfaces and are connected via an SPI bus in the daisy chain configuration.

18. The system of claim 16, wherein the second master is a microcontroller, and the microcontroller comprises a diagnostic function for monitoring one of the plurality of slaves and wherein the microcontroller is further coupled to the one slave to be monitored.

19. A method for use in a system comprising a first master, a second master, and a plurality of slaves coupled to the first master in a daisy chain configuration,
the method comprising:
providing a coupling device comprising a first slave, a second slave, and at least one buffer;
coupling the first slave to the plurality of slaves and the first master in the daisy chain configuration;
coupling the second slave to the second master; and
buffering data received by one of the two slaves of the coupling device before forwarding the data via the other slave, even if the first slave and the second slave are driven by different clocks,
wherein the coupling device acts as a link between the second master and the coupling of the first slave and the first master.

20. The method of claim 19, wherein data exchange between the first slave and the second slave is carried out by an exchange of complete data words, wherein data is buffered in the buffer until a data word is completed.

21. The method of claim 19, wherein the coupling device transfers data between the first and second slave as complete words.

22. The method of claim 19, wherein the coupling device identifies a word to be exchanged between the first and second slave after receiving a predetermined number of data bits.

23. The method of claim 22, wherein the coupling device checks a data content of the word and determines, based on the result of the check, whether the word will be exchanged between the first and second slave.

24. The method of claim 22, wherein the predetermined number of data bits is specified by the second slave device.

25. A coupling device comprising:
a first slave configured to be coupled to and communicate with a first microcontroller;
a second slave configured to be coupled to and communicate with a second microcontroller; and
at least one buffer enabling data exchange between the first slave and the second slave, even if the first slave and the second slave are driven by different clocks,
wherein the coupling device acts as a link between the second microcontroller and the coupling of the first slave and the first microcontroller.

* * * * *